United States Patent [19]

Billington

[11] Patent Number: 4,912,927
[45] Date of Patent: Apr. 3, 1990

[54] ENGINE EXHAUST CONTROL SYSTEM AND METHOD

[76] Inventor: Webster G. Billington, 1003 Wilshire Blvd., #203, Santa Monica, Calif. 90401

[21] Appl. No.: 236,703

[22] Filed: Aug. 25, 1988

[51] Int. Cl.⁴ .............................................. F02B 35/00
[52] U.S. Cl. ...................................................... 60/315
[58] Field of Search .................................. 60/315, 269

[56] References Cited

U.S. PATENT DOCUMENTS

| | | | |
|---|---|---|---|
| 1,901,381 | 3/1933 | Smith | 60/315 |
| 2,806,347 | 9/1957 | Pertile | 60/315 |
| 3,241,310 | 3/1966 | Hoadley | 60/269 |
| 3,666,422 | 5/1972 | Rossel | 60/315 |

*Primary Examiner*—Douglas Hart
*Attorney, Agent, or Firm*—Thomas D. Linton

[57] ABSTRACT

An exhaust control system for assisting in discharging exhaust gases to control exhaust noise and increase engine performance by reducing back-pressure and lower piston exhaust resistance, and rapidly lowering the temperature of exhaust gases in internal combustion engines and of superheated gases or fluids in other thermodynamic processes through a uniquely short transit distance. The system is comprised of a housing having a aerodynamically designed air intake section, a dual section rotary hollow blade assembly, and an exhaust section. The intake section has a ball mouth designed to accelerate intake air into the dual section rotary blade assembly receiving exhaust gases or superheated steam or fluids. The accelerated air and rotary blade draw exhaust gases from the engine exhaust manifold of an internal combustion engine and expel them through an exhaust section. The rotary hollow blades are driven by a belt driven pulley and shaft extending outside the intake section.

12 Claims, 2 Drawing Sheets

U.S. Patent    Apr. 3, 1990    Sheet 1 of 2    4,912,927
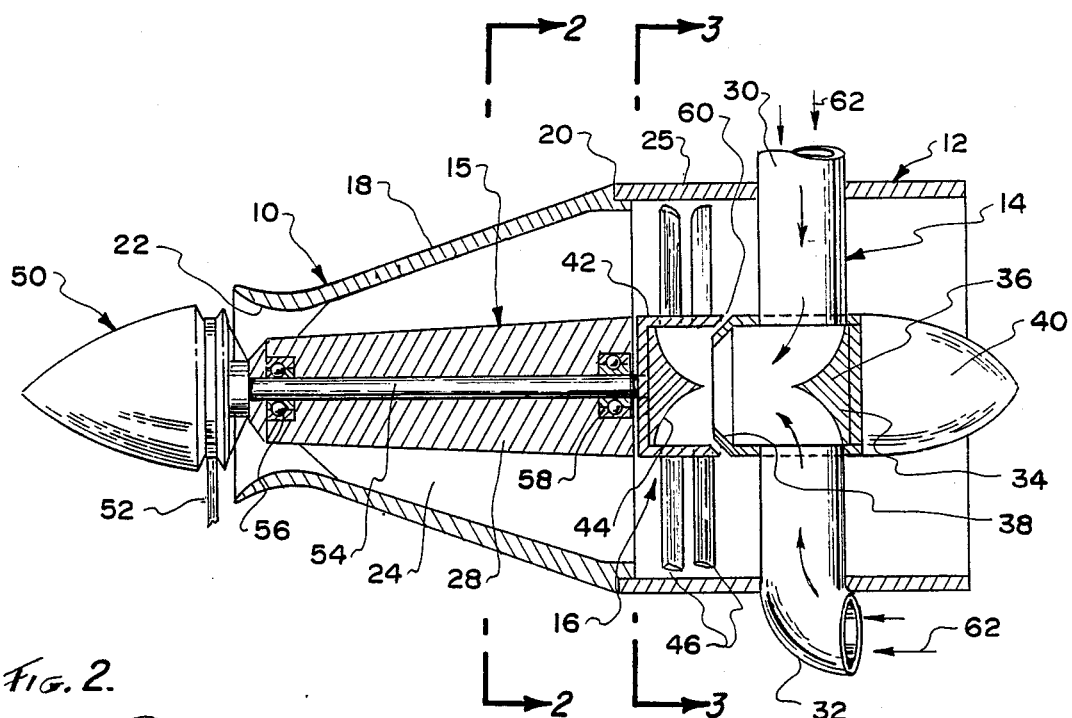
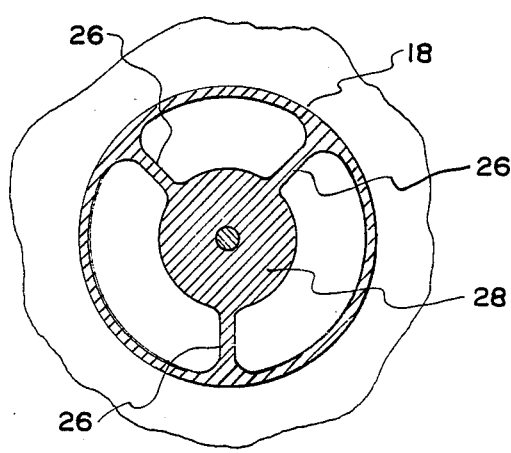
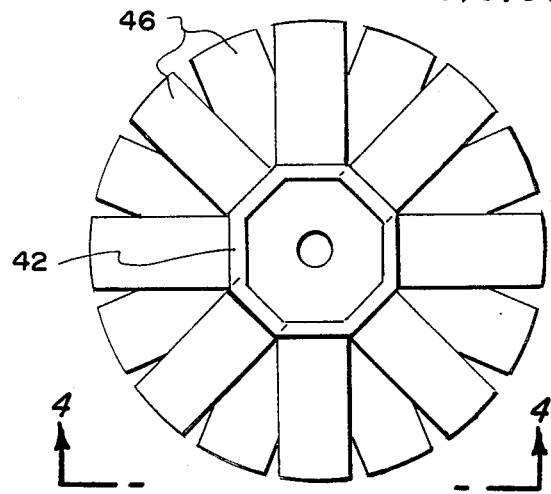
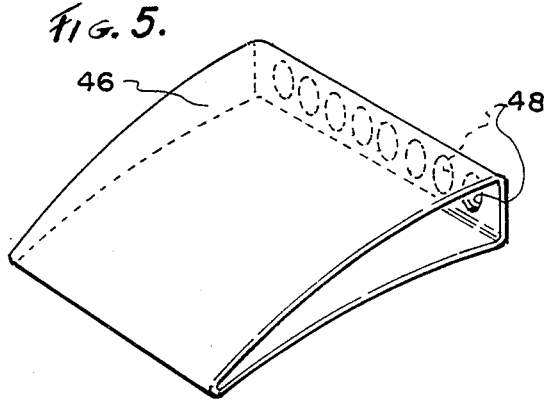
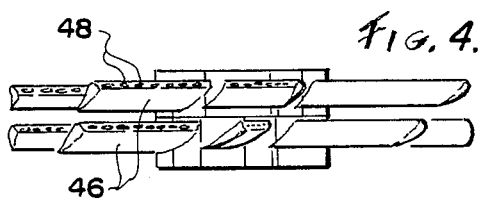

4,912,927

ENGINE EXHAUST CONTROL SYSTEM AND METHOD

FIELD OF THE INVENTION

This invention relates to exhaust control systems and more particularly relates to an exhaust control system which attenuates and controls unwanted exhaust noise, heat and pollutants, while improving the overall performance of an internal combustion engine, a steam or other thermodynamic plant or reactor.

BACKGROUND OF THE INVENTION

In the past, the general approach to controlling objectional engine noise has been to force exhaust gases through a series of baffles designed to convert acoustic energy to mechanical work, and to employ a lengthy system of pipes designed to vent polluted gases at the rear of the vehicle. Both of these systems, however, produce positive back-pressure at the exhaust port of the cylinders. This back-pressure not only tends to impede post ignition purging of gases during the exhaust cycle, but also tends to leave a residue that limits complete charging of engine cylinders with combustion mixture on the intake cycle.

Further, in recent years at considerable cost to the public in a worsened fuel economy, the addition of the mandatory catalytic converters has aggravated the positive back-pressure problem. These catalytic converters may also contribute to the formation of pollutants by increasing high temperature dwell time of exhaust gases. Efforts to compensate for the effects of exhaust stream back-pressure have been made by incorporating "supercharger" devices in the carburetor system. These devices are only partially effective as they can only reduce but not reverse the back-pressure factor.

There is also a wide spread belief that heat generated in the manifold and engine block by back-pressure of the exhaust system somehow enhances combustion efficiency. However, this belief overlooks the fact that much greater heat is generated by combustion initiated in or near the center of the cylinder and spreads to the relatively cool sides. Also, it is precisely the high temperatures in the manifold produced by back-pressure of conventional exhaust systems that accelerates the formation of compounds such as NO and retards the oxidation of CO to carbon dioxide. Further, back-pressure inhibits purging of burned and unburned combustion products from the cylinder during exhaust-stroke cycle of the piston, and regardless of other engine improvements, fuel economy in conventional engines are always limited to some degree by these residual unpurged exhaust gases in the cylinder at the beginning of the intake cycle. The associated carbon particles formed from incompletely burned fuel are randomly deposited on exposed metal surfaces of the combustion chamber and are chiefly responsible for the carbon deposits and oil sludge that gradually reduce engine efficiency and increase engine wear.

Previously, exhaust systems have employed conventional muffler arrangements, and more recently air pumps, as a means for quieting, dispersing and evacuating exhaust gases. Pumps have been also employed primarily with diesel engines for evacuating exhaust gases as a means for increasing the breathing efficiency of the engine. Heretofore none of these systems have incorporated a plurality of these conventional methods into a single device.

The present invention seeks to solve some of the inefficiencies of these conventional exhaust systems when installed to replace the exhaust plumbing, mufflers and catalytic converters (if any) on internal combustion engines.

It is therefore one object of the present invention to provide an exhaust conditioning system to control unwanted exhaust heat.

It is another object of the present invention to provide an exhaust conditioning system which improves the control of unwanted exhaust noise and engine noise transmitted through the exhaust gas medium, in a configuration which can replace conventional muffler systems.

Yet another object of the present invention is to rapidly reduce exhaust gas temperatures below critical levels at which pollutants such as NO and CO are propagated, by an efficient heat exchanged system in a configuration which can replace catalytic converter systems.

Still another object of the present invention is to provide an exhaust control system which frees pistons from exhaust resistance on the expelling stroke to improve engine performance, efficiency, and fuel economy by reducing back pressure.

BRIEF DESCRIPTION OF THE INVENTION

The purpose of the present invention is to provide an exhaust conditioning and control system which is easily attached to internal combustion engine exhaust manifolds for processing exhaust gases through an enclosure which houses a ducted fan. The assembly can be quite small and is easily mounted directly to an engine block under the hood with exhaust gas input ports connected to a small exhaust manifold. The system has a double section rotary blade system belt driven from a convenient power takeoff drive on the engine. The belt driven fan system load on the engine is more than offset by the increase in engine power resulting from decreased back pressure of the system.

The moving mechanical parts of the system comprise a belt driven pulley attached to the dual section rotary fan blade assembly through a drive shaft. The front (leading edge) of the shroud provides a bell mouth opening for drawing a small flow of external air into the double section rotary fan blades. A first-stage section upstream from and adjacent to the rotary fan blades provides passages for connection to exhaust manifold and directs exhaust gases through the hollow fan blades into the second-stage chamber. The second-stage is a cylindrical exhaust section for venting the air and exhaust gas mixture into the atmosphere.

The pulley-driven dual section rotary fan blade draws exhaust gases through the inhalator assembly, the hollow hub of the fan assembly, the fan blades and into the venting chamber through several changes of flow direction, while the bearing-cooling air flows axially through the fan assembly into the venting chamber. The effect of the negative back pressure (partial vacuum) created by the dual section ducted fan is to more completely purge the engine cylinders on the exhaust stroke allowing a greater and more evenly distributed fuel/air mixture to enter during the charge cycle; this results in improved fuel efficiency as evidenced by the discovery that when the device is installed on gasoline or diesel engines it is invariably necessary for the fuel mixtures to be leaned out to allow the engine to run smoothly at all RPM and loading.

In addition to improved engine performance another feature is the superior muffler function achieved in part by the baffle action of the pierced hollow blades, in part by the thickness and shape of the rigid metal housing, and in part by the attenuation of acoustic energy in passing through the partial vacuum created in the first stage chamber.

The above and other novel features and advantages of this invention will be more fully understood from the following detailed description and the accompanying drawings, in which:

BRIEF DESCRIPTION OF THE DRAWINGS

FIG. 1 is a cross-sectional side elevation of an exhaust gas conditioning and control system according to the invention.

FIG. 2 is a cross-sectional view taken along line 2—2 of FIG. 1.

FIG. 3 is a cross-sectional view taken along line 3—3 of FIG. 1 illustrating a rotary blade assembly.

FIG. 4 is a side elevation of a rotary blade assembly taken at 4—4 of FIG. 3.

FIG. 5 is a perspective view of a rotary blade for use in the invention.

DETAILED DESCRIPTION OF THE INVENTION

Figure 6:
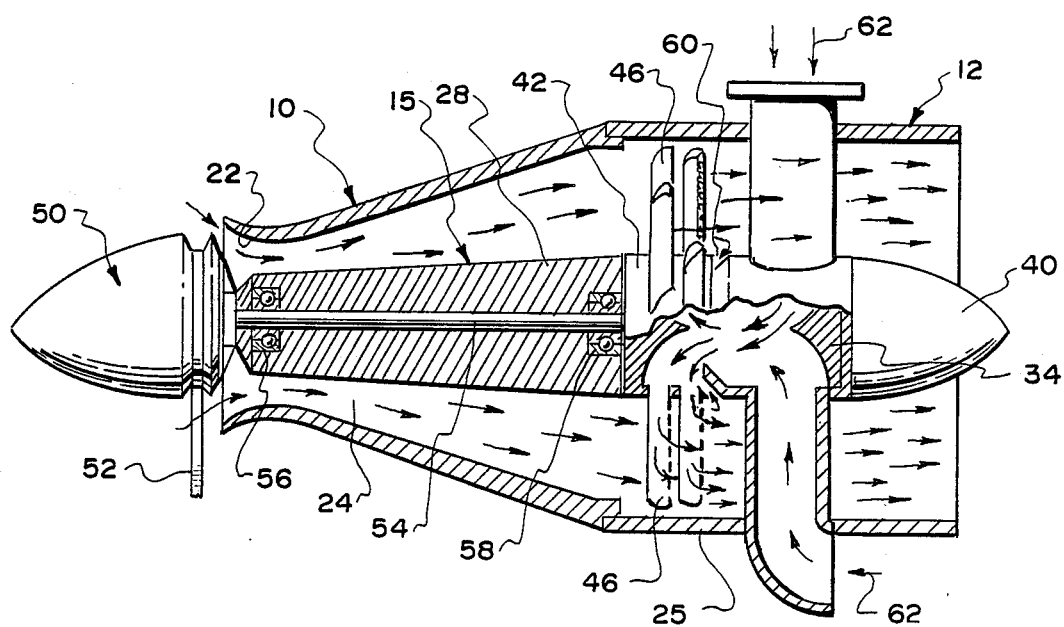
FIG. 6 is a cross-sectional side elevation of the exhaust conditioning system according to the invention illustrating its operation.

A system for reducing engine exhaust noise, improving engine efficiency and reducing exhaust pollution by rapid heat-exchange action is illustrated in FIG. 1. The system is comprised of five main sections of air intake section 10, final exhaust venting section 12, engine exhaust inhalator section 14 and dual section rotary fan blade assembly 16 and rotary fan blade assembly drive system 15. Dual section rotary fan blade 16 draws air through air intake accelerator section 10 for mixing with exhaust gases received through inhalator assembly 14 which are then propelled out through exhaust venting section 12.

Atmospheric air intake accelerator section 10 is comprised of a conically tapered shroud 18 attached to cylindrical exhaust venting section 12 at 20 by any suitable means, such as welding or bolting through a suitable insulating gasket. The shroud 18 has a specially configured aerodynamically constricted bell mouth 22 that provides an expanding flow of cooling air to the plurality of chambers 24 contained in webs 26. The webs 26 support a cylindrical bearing housing island 28.

Air drawn through the air accelerator section 10 and axially through the fan assembly is then mixed with gases received through inhalator assembly 14 comprised of exhaust pipes 30 and 32, which are connected to the exhaust manifold of an internal combustion engine. The exhaust pipes 30 and 32 are in opposed 180° relationship and are connected to a stationary cylindrical inhalator assembly 34 having a conical flow shaper 36 to direct exhaust gases into the rotating conical section mouth 38. Tail cone tip 40 on inhalator hub 34 provides an aerodynamic surface to smooth the flow of exhaust gases vented to atmosphere.

The dual fan blade section has a hollow hub 42 having a conical surface 44 in opposed relationship to the conical section mouth 38 of the inhalator assembly. Attached to hub 42 are sixteen individual hollow blades 46 (FIG. 3) in two sections of eight each. In addition to being axially displaced, as shown in FIG. 1, the blades of each section are angularly offset, as shown in FIG. 3. All sixteen blades 46, as well as hub 42, are of hollow chamber construction. A typical blade 46 is shown in FIG. 5 in which the blade has a hollow construction and a plurality of apertures 48 in the trailing edge.

Rotary fan blade assembly 16 is driven by a pulley system comprised of a conical spinner and pulley assembly 50 driven by belt 52. The pulley 50 is connected to the rotary fan blade assembly 16 by a drive shaft 54 supported by bearings 56 and 58 mounted in housing 28. The front and back bearings 56 and 58 are housed in housing 28 to support hub 42 at one end and the belt driven pulley 50 at the other. Bearing assemblies 56 and 58 receive their cooling from the atmospheric air intake and by the inherent ability of cast housing 28 to act as a heat sink. The housing encloses the cold section or chamber of the device.

Inhalator hub 34 is at a point downstream to the rear of rotary blade hub 42 at a precise distance. An air bearing gap 60 is maintained at a precise distance between rotating hub 42 of rotary blade assembly and inhalator hub 34. Preferably this gap 60 is maintained at approximately 1/64th of an inch. The inhalator assembly of exhaust pipes 30 and 32 connected to inhalator assembly 34 provides a recycling circuit exhaust gas flow control guide from the engine to the inhalator collecting assembly 38.

The internal action of the exhaust gas control system is illustrated in the sectional view of FIG. 6. The first action is the delivery of intake ram air through constricted bell mouth 22 at the forward end of the assembly which passes bearing-cooling air through the chamber 24 and axially through blades 46 on the rotary ducted fan, around the intake pipes of the inhalator assembly and out through the open end of final exhaust section 12. The second action in the system is the internal one inside the inhalator assembly leading into the rotary blade hub assembly and out the hollow blades. The high temperature from the exhaust gases drops by as much as eighty five percent at the outlet of final exhaust assembly 12. This heat exchange capability is caused in part by the aerodynamic action of the ducted fan system which produces negative pressure at the rear of each individual trailing edge of each blade 46. The hot gases emerging from small holes 48 in each blade provide a jet thrust action to the rotating assembly, and expand rapidly to produce an additional cooling effect.

This jet action and expansion cooling effect are of particular significance where this invention is used as a heat-exchanger and/or generator in a steam plant or reactor.

Cold ambient air entering bell mouth 22 passes through chambers 24 and emerges at the face of each leading edge of blades 46, while also passing completely around the exterior contour of each and every blade from the root of the blade to the extreme tip. This produces temperature drop not only within the blade, but around the hub assembly 16 as well. Thus, as shown in FIG. 1, the hot gases indicated by arrows 62 flow through inhalator assembly 34, hollow hub 42, rotary blades 42 and out through apertures 48 and blades 46. Atmospheric air is also drawn into this exhaust flow stream through aperture 60 between the rotary blade hub 42 and inhalator assembly 34 to be combined with the reverse flow of hot gases and either vented through the exhaust section 12 of an open-ended system, or ducted from 12 back to the carburetor air intake in a partially closed recycling system, carburetor and ducting, not shown in the drawings.

Considering for a moment the flow pattern, as shown in FIG. 6, the hot gases enter one side of the inhalator assembly and now make a ninety degree turn running upstream in a line parallel to the axis of the apparatus as the gases enter the hub 42 of the rotary blade assembly. The hot gases then make a second ninety degree turn this time into the root of blades 46 where they are attached to hub 42 and through the blades 46. The hot gases then make another ninety degree turn toward the rear trailing edge where they have undergone a 270° directional change and are mixed with the free flow of cooling intake air coming through chambers 24. The additional thrust imparted to the fan assembly in the third 90° turn compensates for drag on the pulley system.

The suppression of impulse noise through the gas medium is mediated by acoustic energy dissipation in the housing 25 18 12 which is preferably made of aluminum of about 6.5 millimeters (6.5 mm) optimum thickness, and by the orthogonal directional transitions created by blades 42 and holes 48 and by the critically spaced gap 60 between the rotating hub 42 and the flow-shaping conical diffuser 34, and by the partial vacuum created by the action of the rotary fan assembly 46 which spins at a higher multiple of the crankshaft RPM.

Through experimentation it was found that the minimum dimension at gap 60 for optimum noise suppression was approximately 1/64th inch; larger gaps, it was discovered, considerably degraded noise attenuation of the system.

Improved engine performance is also realized by the negative back-pressure produced by this system. The reversal in pressure is reflected back into the combustion chamber from the instant the exhaust valve is opened, accelerating purging action and reducing residual hydrocarbons which tend to form carbon incrustations within the cylinder and oil sludge, thus enhancing engine life and performance. The negative pressure produced by this system also tends to enhance expansion cooling of combustion chamber and combustion mixture, thus driving the hydrocarbon oxidation reaction toward more complete combustion and resulting in improved performance.

Thus there has been disclosed a unique exhaust gas conditioning and control system which can substantially improve noise reduction, reduce back-pressure to enhance engine performance, and effect significant reduction of pollutants, as well as a unique system inherently capable of accelerating the heat exchange function in steam and other thermodynamic plants or reactors.

This invention is not to be limited by the embodiment shown in the drawings and described in the description which is given by way of example and not of limitation, but only in accordance with the scope of the appended claims.

What is claimed is:

1. An exhaust gas control apparatus for an internal combustion engine comprising;
   a rotary fan blade assembly having a hollow hub and plurality of hollow blades, each having a plurality of apertures in a trailing edge;
   drive means for driving said rotary fan blade assembly;
   feed means feeding exhaust gases from said engine into said hollow hub and hollow blades;
   air intake means for feeding intake air to said rotary fan blade assembly from a direction opposite to the direction of flow of said exhaust gases into said hollow hub of said rotary fan blade assembly;
   exhaust means for exhausting a mixture of air and said exhaust gases;
   whereby the flow of exhaust gases through said rotary fan blade assembly and out through said exhaust means reduces back-pressure, exhaust noise, exhaust temperature and exhaust pollutants.

2. The apparatus according to claim 1 in which said feed means; said hollow hub and hollow blades are constructed and arranged to reverse the direction of flow of said exhaust gases thereby attenuating noise transmitted through exhaust gas medium.

3. The apparatus according to claim 2 in which said feed means comprises; exhaust gas pipes for connection to an engine exhaust manifold; an inhalator means having an outlet adjacent to said hollow hub of said rotary fan blade assembly; said exhaust gas pipes being perpendicular and on opposite sides of said inhalator means.

4. The apparatus according to claim 1 in which said drive means comprises a belt-drive means connected to said rotary fan blade assembly.

5. The apparatus according to claim 4 in which said air intake means comprises a truncated conically shaped shroud having a constricted bell mouth shaped inlet for accelerating air to said rotary fan blade assembly.

6. The apparatus according to claim 5 including a housing surrounding said rotary fan blade assembly between said air intake shroud and said exhaust means; said housing and shroud internally constructed and arranged to provide an optimum clearance to maximize noise attenuation.

7. The apparatus according to claim 1 in which said rotary fan blade assembly is comprised of a dual section fan blade assembly with sections offset axially from each other.

8. The apparatus according to claim 7 in which each section of said dual section blade assembly has eight blades.

9. The apparatus according to claim 8 in which said eight blades of each section are angularly staggered around said hollow hub.

10. The apparatus according to claim 9 in which each hollow blade contains a plurality of apertures in its trailing edge.

11. The apparatus according to claim 6 in which the housing and shroud are constructed of aluminum or other highly heat-conductive material to act as an effective heat sink medium.

12. The apparatus according to claim 1 in which ducting means connected to exhaust means directs exhaust gas flow from exhaust means to the air intake of an internal combustion engine, thereby creating a partially closed recycling system.

* * * * *